United States Patent [19]

Kremen

[11] Patent Number: 5,185,917
[45] Date of Patent: Feb. 16, 1993

[54] METHOD OF MACHINING KEYWAYS IN SHAFTS

[76] Inventor: Gennady Kremen, 7920 4th Ave. #F 12, Brooklyn, N.Y. 11209

[21] Appl. No.: 733,681

[22] Filed: Jul. 22, 1991

[51] Int. Cl.⁵ .............................................. B23C 3/30
[52] U.S. Cl. .................................... 29/558; 409/132; 409/177; 409/293
[58] Field of Search ............... 409/131, 132, 177, 293, 409/304; 29/558

[56] References Cited

U.S. PATENT DOCUMENTS

| | | | |
|---|---|---|---|
| 1,707,274 | 4/1929 | Retterath | 409/132 |
| 3,370,508 | 2/1968 | Iaia | 409/132 |
| 3,888,161 | 6/1975 | Baudermann | 409/132 |
| 4,778,314 | 10/1988 | Borys | 409/132 |
| 4,786,219 | 11/1988 | Oberlin et al. | 409/132 X |

*Primary Examiner*—Z. R. Bilinsky
*Attorney, Agent, or Firm*—Ilya Zborovsky

[57] ABSTRACT

A method of machining keyways in shafts comprises the steps of aligning a central line of a spindle of a machine tool with a center line of a shaft to be machined, preliminarily machining a keyway in the shaft with keyway mill arranged on the spindle so as to retain a symmetrical allowance for a finishing machining of the keyways so as to machine walls of the keyway, finishing machining of radiused parts of the keyway at its both ends with a cross-feed of the mill so that a width of radiused parts is greater than a desired width of the keyway, and final machining the keyway with a self-aligning cutting tool mounted on the spindle so that it freely turns and is rectilinearly moved along the keyway.

8 Claims, 2 Drawing Sheets

METHOD OF MACHINING KEYWAYS IN SHAFTS

BACKGROUND OF THE INVENTION

The present invention relates to a method of machining keyways in shafts.

During machining of closed, open and semi-open keyways in shafts for inserting of parallel, rectangular or parallel square keys, several methods of machining are used. The most famous of these methods includes the following steps:

- machining with measured keyway mill of the keyway width in one passage; and
- machining with non-measured keyway mill of the width in several passages with the use of milling, turning and other machine tools.

When the above methods are used, the keyways in the shafts are not interchangeable due to inaccuracies in the width of the keyways, deviation from symmetricality of the plane of symmetry of the keyways, and substantial roughness of the keyway side surfaces.

As a result, when the keyway assemblies are produced it is necessary to adjust a key due to the above mentioned inaccuracies in the keyways, since it is impossible to adjust the keyway in the shaft as to its width and symmetricality.

SUMMARY OF THE INVENTION

It is therefore an object of the present invention to provide a method of machining of keyways which avoids the disadvantages of the prior art.

More particularly it is an object of the present invention to provide a method of machining of keyways which insures the interchangeability of the keyways and also increase of the process efficiency.

In keeping with these objects and with others which will become apparent hereinafter, one feature of the present invention resides, briefly stated, in a method of machining keysways in shafts in accordance with which the axis of a spindle of a machine tool is aligned with the axis of a shaft to be machined, a keyway is preliminarily machined with a keyway mill, clamped in an adaptor so as to machine a bottom face and walls of the keyway with retaining on the walls an allowance for a finishing machining, finishing machining of radiused parts of the keyway by a cross-feed of the same mill so that the width of the radiused parts is greater than the required width of the keyway, and finishing machining of the keyway with a self-adjusting cutter with the same position of a spindle by introducing the cutter into the radiused part of the keyway until it touches the bottom face and then rectilinearly moving the cutter without a spindle rotation along the keyway.

When the method is performed in accordance with the present invention it eliminates the disadvantages of the prior art and achieves the objects specified hereinabove.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
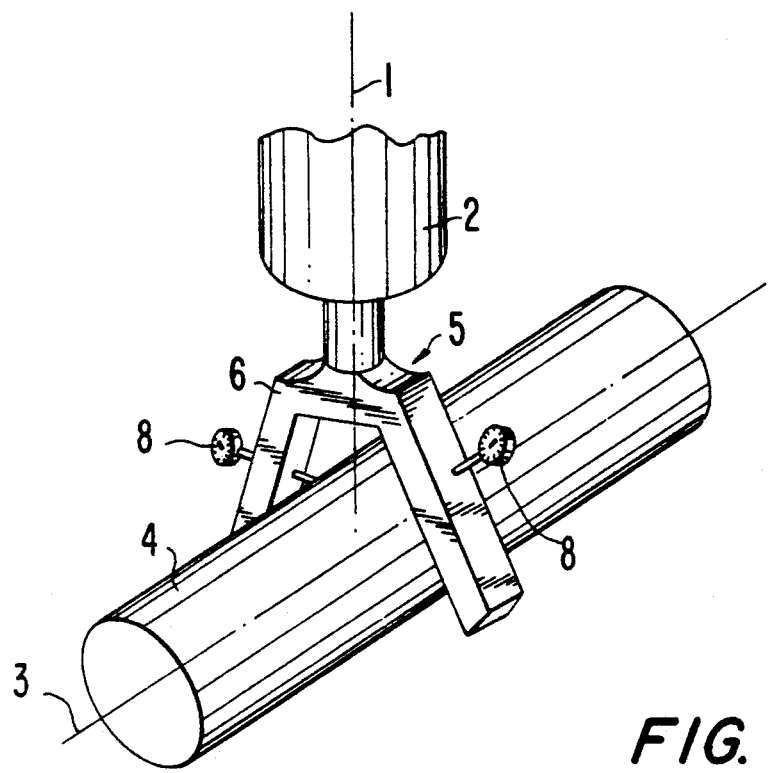
FIG. 1 is a view showing a first step of the method in accordance with the present invention which involves aligning of a spindle axis with the axis of a shaft to be machined.
Figure 2:
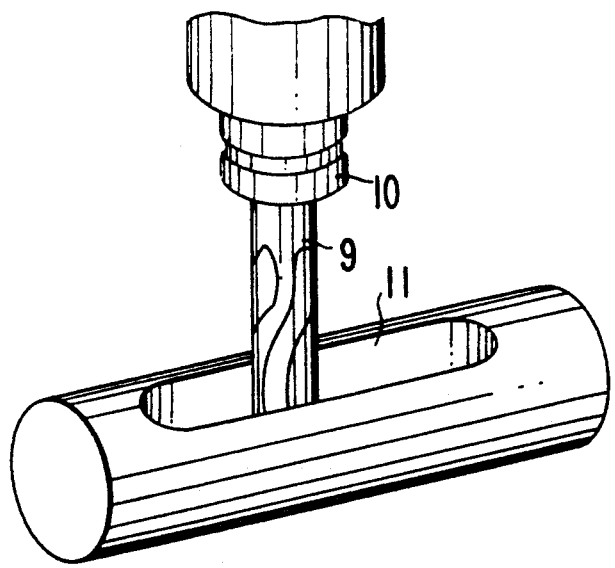
FIG. 2 is a view showing the step of preliminarily machining a keyway in a shaft in accordance with the present invention.
Figure 3:
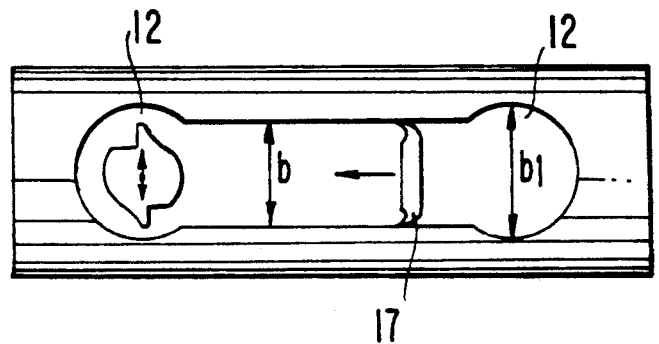
FIG. 3 is a view illustrating a next step of producing radiused parts of the keyway in the shaft of the inventive method.

In accordance with the method of machining of keyways in shafts of the present invention, first of all a center line 1 of a spindle 2 of a machine tool is aligned with a center line 3 of a shaft 4 to be machined. For this purpose, a device 5 is used which includes a V-shaped body 6 mountable on the spindle 2 and having two indicators 7 mounted on the legs of the V.

The aligning device 5 is mounted so that the gauges 7 are brought in contact with the shaft. Then the machine tool table with the shaft, or the machine tool spindle with the aligning device, are removed in direction perpendicular to its axis so as to obtain identical readings on two indicators of the aligning device. In order to eliminate the influence of radial shaking of the machine tool spindle on the readings of the indicator, the above mentioned movement is repeated, but the aligning device is preliminarily turned by 180°, and the spindle or the shaft are displaced by half value deviation of the indicator reading during the repeated change in a direction perpendicular to the axis of the shaft.

In a second step, a keyway mill clamped in an adaptor 10 which is mounted on the same spindle is used for machining a bottom face and walls of a keyway 11. At the same time, symmetrical allowances are retained on the walls for a finishing machining of the keyway.

In the next step of the method a finishing machining of radiused parts 12 of the keyway is performed with the same mill 9. For this purpose the mill is cross-fed transversely to the center axis of the keyway. The width b1 of the radiused parts 12 of the keyway is retained greater than a desired width b of the keyway.

Figure 4:
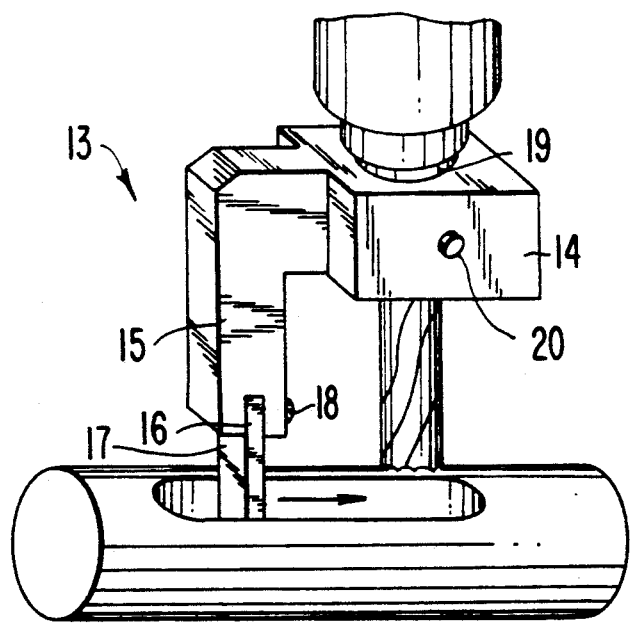
FIG. 4 shows a finishing step of a method of machining keyways in accordance with the present invention.

The finishing machining of the keyway is shown in FIG. 4. A quick change self-aligning tool 13 is mounted without removing of the mill in the same adaptor. On the other hand, the mill with the adaptor can be removed and the cutter 13 with its own adaptor is mounted on the spindle. The tool 13 has a body 14 with a projection 15 which is offset from the center axis of the spindle or more particularly of an opening with which the tool is mounted on the spindle and extends toward the keyway bottom. The projection 15 has a groove 16 for mounting a two-blade cutting member 17 fixed by a fixing part 18. The tool as a whole is turnably mounted with its opening 19 on the spindle and has a fixing member 20 for preventing its falling down.

For finishing machining the two-blade member 17 is introduced into the radiused part of the keyway until it touches its bottom face. Without rotation of the spindle, the tool or the shaft is moved rectilinearly so as to machine the walls of the keyway in one passage.

First, the two-blade member is in contact with one wall of the keyway, and then after the beginning of the movement is in contact with the other wall. This is a process of a self-alignment of the tool without actual cutting. After the beginning of contacting of both blades of the tool with the walls of the keyway the process of the self-alignment starts under the action of the difference of radial components of the cutting force. The tool passes approximately 0.2 inch, and the step of established cutting begins when the components of the cutting force at both blades are equalized or in other words the depths of cutting at both walls of the keyway are equal.

In order to eliminate disturbances of this mode, for example under the influence of different hardness of the walls of the keyway, defects in the structure of the metal of the shaft, and also in order to correct the deviations of the position of the plane of symmetry of the keyway after the preliminary machining for example due to the deflection of the mill, as well as non-stiffness of the system, etc. approximately after 0.2 inch of cutting with the tool, a second position of the tool is set, which excludes turning of the tool on the adaptor. In other words the position assumed by the tool after the self-aligning step under the action of the difference of the components of cutting force is fixed by the fixing element 20, and the spindle is braked if needed.

The cutting tool 17 is self-aligned in the keyway due to the swinging of it in the adaptor and in displacement relative to the opening 19 in direction which is opposite to the direction of feed.

The rear edges of the cutting tool are curved or flat.

In accordance with the present invention, the self-aligning tool operates in the machine tools which cuts the material with a rotatable tool and use the process of planing which is performed by the self-aligning tool.

It will be understood that each of the elements described above, or two or more together, may also find a useful application in other types of methods differing from the types described above.

While the invention has been illustrated and described as embodied in a method of machining of keyways, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of machining keyways in shafts comprising the steps of aligning a central line of a spindle of a machine tool with a center line of a shaft to be machined; preliminarily machining a keyway in the shaft with keyway mill arranged on the spindle so as to retain a symmetrical allowance for a finishing machining of the keyway so as to machine walls of the keyway; finishing machining of radiused parts of the keyway at its both ends with a cross-feed of the mill so that a width of radiused parts is greater than a desired with of the keyway; and final machining the keyway with a cutting tool which is self-aligned in the keyway and mounted on the spindle so that it freely turns and is rectilinearly moved along the keyway to finally machine the walls of the keyway.

2. A method as defined in claim 1, wherein said self-aligning tool includes a machining member provided with two blades.

3. A method as defined in claim 1, wherein said self-aligning tool includes a body turnably mountable on the spindle and a projection which is offset relative to the center line of the spindle and extends toward the keyway with its end, said end being provided with a two-blade machining member, so that the latter freely turns and is rectiliniearly moveable along the keyway.

4. A method as defined in claim 1; and further comprising an additional finishing machining step performed after said finishing machining step of said keyway and including rectilinearly moving said tool so that it is fixed and does not turn relative to the spindle.

5. A method as defined in claim 1, wherein said preliminarily machining step includes using a mill with an adaptor mountable on the spindle, said step of finally machining the keyway includes mounting of said self-aligning tool on the same adaptor.

6. A method as defined in claim 1, wherein said preliminarily machining step includes using a mill with an adaptor mountable on the spindle, said step of finishing machining of the keyway includes removing the mill with the adaptor and mounting the self-aligning tool with its own adaptor on the spindle.

7. A method as defined in claim 3, wherein said two-blade machining member has rear faces which are curved.

8. A method as defined in claim 3, wherein said two-blade machining member has rear faces which are flat.

* * * * *